B. B. Hill.
Hand Stamp.
No. 3,927. Reissued Apr. 19, 1870.
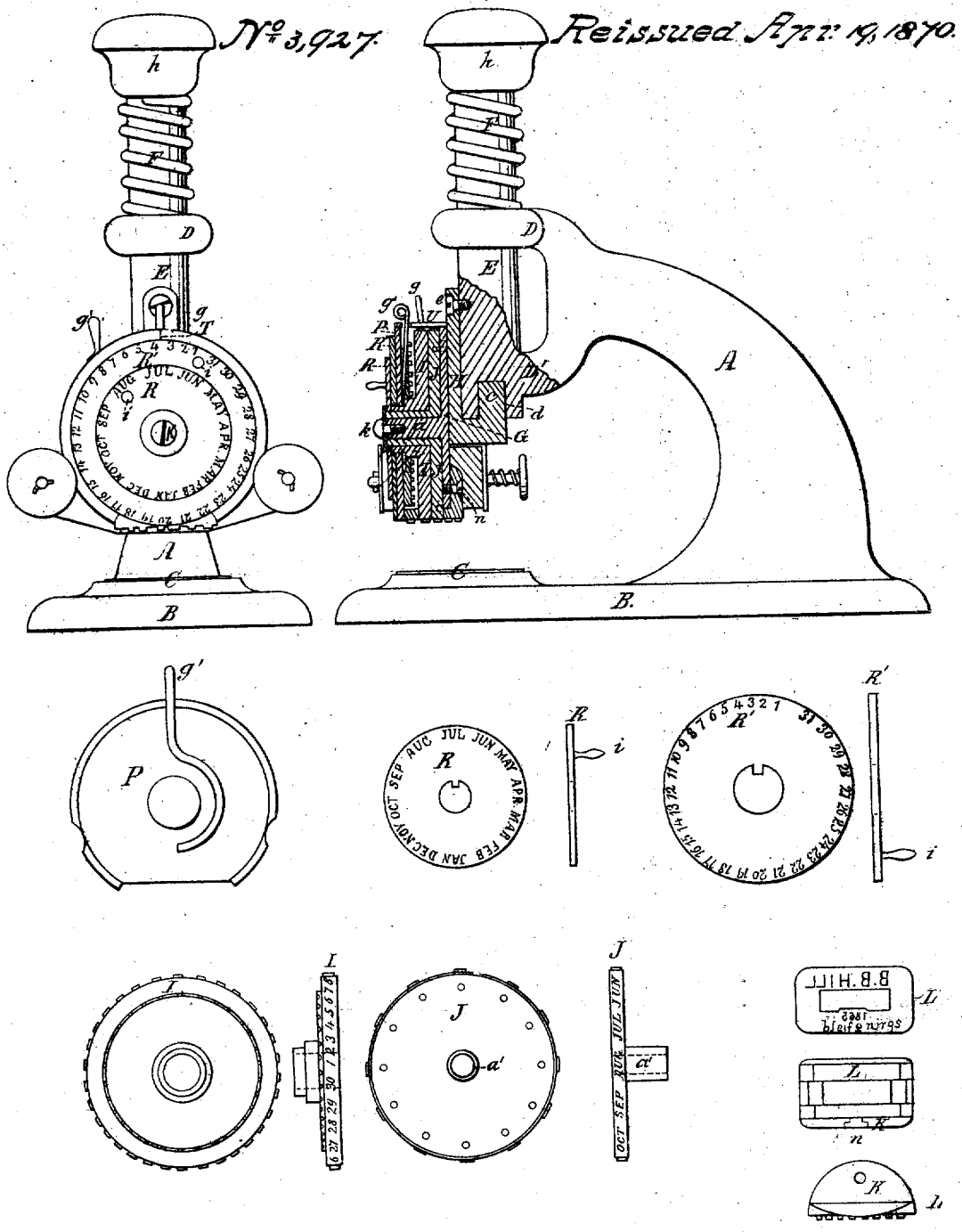
Witnesses
N. C. Wolder
Jeremy W. Bligs
Inventor:
B. B. Hill

United States Patent Office.

B. B. HILL, OF CHICOPEE, MASSACHUSETTS.

*Letters Patent No.* 59,395, *dated November* 6, 1866; *reissue No.* 2,836, *dated January* 14, 1868; *reissue No.* 3,261, *dated January* 12, 1869; *reissue No.* 3,927, *dated April* 19, 1870.

IMPROVEMENT IN HAND-STAMPS.

The Schedule referred to in these Letters Patent and making part of the same

*To all whom it may concern:*

Be it known that I, B. B. HILL, of Chicopee, in the county of Hampden and State of Massachusetts, have invented certain new and useful Improvements in Hand-Stamps; and I do hereby declare that the following is a full, clear, and exact description thereof, reference being had to the accompanying drawings making a part of this specification and to the letters of reference marked thereon, in which—

Figure 1 is a side elevation, a part of which is in section, showing the details of its construction.

Figure 2 is a front elevation, showing the wheels or dials, upon which are affixed certain characters or figures, representing corresponding characters or figures upon the printing-face of the type-wheels.

The nature of my invention consists in the construction and arrangement of a hand-stamp, whereby the characters or figures which it is desired to stamp upon paper or other matter may be indicated or shown with certainty at some point upon the vibrating portion of the stamp, said characters or figures, together with the die, being attached to said vibrating portion of the stamp; and, also in the arrangement of the several parts of said stamp whereby its construction and operation may be greatly facilitated.

That others skilled in the art may be able to make and use my invention, I will proceed to describe its construction and operation.

A represents the stock, which may be of any desired form, attached at its lower end to the bed-plate B, to which bed-plate B is also attached the pad C, upon which the material is laid to be stamped.

The upper end of the stock A terminates in the forked projections D and D′, which are provided with vertical perforations or sockets, into which passes the spindle E, fitted to operate freely, said sockets serving to keep the spindle E always in vertical position.

The lower projection, D′, is provided with a vertical slot, *d*, cut at nearly a right angle with the stock A, said slot serving as a guide to the bracket H, which is made upon or attached to the back side of the wheel-case G, this construction and arrangement serving to keep the wheel-case G always in the same relative vertical position with and at right angles to the stock A.

At the upper end of the spindle E is the head *h*, either made whole with said spindle or attached to it, which head *h* receives the blow which forces the spindle E to actuate the stamp or stamping-wheels.

The spring F, or its equivalent, is attached to or placed upon the spindle E, the upper end of which spring bears against the under side of the head *h*, while the other end bears against the projection D, or against a protuberance upon said projection D, the said spring F operating to keep the spindle E at its highest elevation, or to cause it to bound upward after being depressed, when the depressing-power is removed.

If desirable, the spindle E may be made of tubing, instead of being solid, and the spring F may be arranged in the interior of the tubular spindle E, one end of the spring F bearing against the under side of the head *h*, the other end bearing against a pin or protuberance in the socket of the projection D, the spindle E in that case being provided with a vertical slot, to allow said spindle to operate freely vertically upon said pin or protuberance, this pin or protuberance serving, also, to prevent the said spindle from turning laterally in its bearings.

G represents the wheel-case and ribbon-case combined, which, together with the axis *a*, are made in one piece, thereby attaining greater uniformity of construction, and greater accuracy in the operation of the stamp.

The wheel-case G is open only upon the front side, and having a channel upon its inside front edge, into which is fitted the cap or plate P, which closes up the chamber of the wheel-case G, thus protecting the stamp I and J from injury, and preventing rapid accumulations of dust thereon.

The bracket H, upon the back side of the wheel-case G, is provided with a step, *c*, which enters the vertical slot *d* in the projection D′, said bracket H extending above the wheel-case G upon the front side of the spindle E, and having an orifice near its top, through which the screw *e* is turned into the spindle E, by which method of construction, the wheel-case G is firmly secured to the spindle E. The wheel-case G may be quickly and easily detached from the spin- E, if desirable, by turning out the screw *e*.

The stamp-wheels I and J rotate upon a common axis, *a*, in the wheel-case G, said wheels I and J having characters and figures upon their peripheries, and are so arranged that one rotates entirely independent of the other.

The periphery of the wheel J is divided into twelve parts, said twelve parts having characters upon them representing the twelve months of the year, and said wheel J is fitted to the axis *a* closely, but turning or rotating freely thereupon, and is provided with twelve indentations or depressions, to receive a detent or spring-catch, *g′*, or its equivalent, for holding said stamp-wheel J, in any desired position.

The said wheel J is also provided with a hub, *a′*, which is perforated to fit the axis *a*, and the outside of said hub *a* serves as an axis, upon which the wheel I rotates.

The said hub *a′* extends forward through the cap

P, and is provided at its front end with a bearing, upon which is secured, by a slot and key, the calender-wheel R.

The periphery of the wheel I is divided into thirty-one parts, each part having figures or characters thereupon representing a certain day of the month. Said wheel I has, also, an annular projection upon one side, said projection having thirty-one indentations or depressions, which are to receive a detent or spring-stop, *g'*, to hold the wheel I in any desired position.

This wheel I fits the exterior of the hub *a'* of the wheel J, in such a manner as to turn freely thereon, and the hub of the said wheel I extends through the cap or plate P, its front being provided with a bearing, upon which the wheel R' is placed, which, like the calender-wheel R, is secured to its bearing by means of a slot and key.

Any desirable number of these stamp-wheels may be used, one fitting the hub of the other, said hubs projecting through the plate P, with a bearing upon their ends for the reception of a like number of wheels or dials.

The detents *g g'* are attached to the wheel-case G and cap or plate P, in such a manner as to drop into the indentations or depressions in the wheels I and J, and remain there by their own elasticity or pressure, and when they are removed or withdrawn from said indentations, the wheels can be rotated to any desired position.

R represents a calender-wheel or dial, the eye of which is provided with a protuberance or key, which is made to fit a slot cut in the hub of the stamp-wheel J, said dial R having characters upon the face thereof, representing the twelve months of the year, and is so arranged upon the hub of the stamp-wheel J, that, when a certain character, representing a certain month, is in a position perpendicularly above the center of the axis *a*, the corresponding characters, representing the same month upon the periphery of the wheel J, shall be in a position perpendicularly under the center of the axis *a*.

R' is a wheel or dial, having in its eye a protuberance made to fit a slot in the hub of the stamp-wheel I, which method of attachment retains the wheel or dial R' in the same relative position with the stamp-wheel I, said wheel or dial R' being provided with certain characters, denoting the thirty-one days of the month, which characters are so arranged upon the face of the dial, that, when any certain character or characters denoting any certain day of the month, shall be in a position perpendicularly above the center of the axis *a*, the corresponding character or characters denoting the same day upon the periphery of the wheel I shall be in a position perpendicularly under the axis *a*.

The wheels I J R R' are secured to the axis *a* by means of the screw *k*, or by any other suitable or desirable means.

T is an index or pointer, placed at the top of the wheel-case G, to indicate the position of the characters upon the peripheries of the wheels I J. It is not necessary, however, to the successful operation of the stamp, that the pointer or index be placed upon the upper part of the wheel-case, as the stamp would operate equally as well if the said pointer were placed at any point upon the outer edge of the face-plate P, and adjacent to the peripheries of the dial-wheels R R'.

It is obvious, that instead of attaching the pointer or index T to the wheel-case, G, a mark or index might be cut or stamped upon the face of the plate P, near its outer edge or some other particular part of the machine might be used as an index in connection with the characters upon the dial-wheels R R', to denote or indicate the position of the characters or figures upon the peripheries of the stamp-wheels I J.

The ribbon which produces the colored impression upon paper, from the pressure of the stamp upon it, is arranged and operated much in the usual manner.

L is a chase, for holding the type used for printing other matter in connection with the date, said chase being provided with a flanch, K, and secured in its proper position by means of the screw *n*, (designed to be a thumb-screw in practice.) The arrangement of this flanch K and thumb-screw *n* greatly facilitates the removal and adjustment of the chase L to the wheel-case G.

These stamps may be constructed with one, two, or more wheels inside the wheel-case G, as may be desirable, without departing from the principle of its construction, as hereinbefore described.

I will now describe the mode of its operation.

If it should be desired to stamp upon paper placed under the type-wheels, and upon the pad, the words and figures "January 1, 1866," the detent *g* is pressed out of the stop in the wheel J, and said wheel J is rotated until the character representing January on the dial, comes to the index T, when the detent *g* is again allowed to enter the corresponding stop in the wheel J.

The detent *g'* is pressed out of its stop in the wheel I, and said wheel I is rotated until the index T points to the character or figure 1 upon the dial, when the detent or spring *g'* is allowed to enter the corresponding stop in the wheel I.

The figures denoting the year, as 1866, may be properly secured in the chase L, and remained fixed during that year, it being only necessary to change the last figure from 6 to 7 for the next year, and so on.

If, now, paper be placed under the type or stamp-wheels, and immediately over the pad C, and a blow be struck upon the head *h*, the date, January 1, 1866, will be imprinted upon the paper.

I am aware that devices have been used for the purpose of stamping numbers upon paper and other matter, as shown in Letters Patent granted to Joseph Pollak, dated July 4, 1865, and I disclaim any and every part of said device, irrespective of my arrangement and construction; but Having clearly described my invention, What I do claim as new, and desire to secure by Letters Patent, is—

1. The series of type-wheels and a series of indicating-characters, for the purpose described, when used in connection with the die, and when all parts are attached to and operate with the vibrating portion of the stamp, substantially as set forth.

2. The bracket H, made on or secured to the case G, having a step, *c*, or its equivalent, to enter the lower end of the spindle and orifice for the screw *e*, for attaching and detaching said case to and from the spindle E, substantially as and for the purpose described.

3. The flanch K, in combination with the chase L, for the purpose of easily and quickly attaching the type-plate to or detaching it from a hand-stamp, when constructed and operating substantially as herein described.

B. B. HILL.

Witnesses:
T. A. CURTIS,
C. E. BUCKLAND.